US010242299B2

(12) United States Patent
Takenaka

(10) Patent No.: US 10,242,299 B2
(45) Date of Patent: Mar. 26, 2019

(54) PRINT DATA PROCESSING APPARATUS

(71) Applicant: CANON KABUSHIKI KAISHA, Tokyo (JP)

(72) Inventor: Shuichi Takenaka, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/391,028

(22) Filed: Dec. 27, 2016

(65) Prior Publication Data

US 2017/0206442 A1 Jul. 20, 2017

(30) Foreign Application Priority Data

Jan. 15, 2016 (JP) .................................. 2016-006673

(51) Int. Cl.
*G06K 15/00* (2006.01)
*G06F 3/12* (2006.01)
*G06K 15/02* (2006.01)

(52) U.S. Cl.
CPC .......... *G06K 15/408* (2013.01); *G06F 3/121* (2013.01); *G06F 3/1244* (2013.01); *G06F 3/1285* (2013.01); *G06K 15/1807* (2013.01); *G06K 15/1813* (2013.01); *G06K 15/1817* (2013.01); *G06K 15/1822* (2013.01); *G06K 15/1849* (2013.01); *G06K 2215/0065* (2013.01)

(58) Field of Classification Search
USPC ....................................................... 358/1.14
See application file for complete search history.

(56) References Cited

U.S. PATENT DOCUMENTS

| 2011/0043855 | A1* | 2/2011 | Ono | G06F 3/1215 |
| | | | | 358/1.15 |
| 2011/0141507 | A1* | 6/2011 | Kawaura | G06F 3/121 |
| | | | | 358/1.13 |
| 2013/0077104 | A1* | 3/2013 | Nakamura | G06K 15/1817 |
| | | | | 358/1.9 |

FOREIGN PATENT DOCUMENTS

JP 2013-14039 1/2013

OTHER PUBLICATIONS

European Search Report dated Jun. 8, 2017 issued in corresponding European application No. 16206914.0.

* cited by examiner

*Primary Examiner* — Ngon B Nguyen
(74) *Attorney, Agent, or Firm* — Venable, LLP

(57) ABSTRACT

In processing using a print data processing apparatus that parallelly interprets pages of print data, in the case where a command to reset the number of already interpreted pages is included in the print data, a certain page to be printed is not printed. In the case of detecting a command to invalidate contents interpreted hitherto, an interpreter stores the number of already interpreted pages at the time in point of the detection of the invalidation command in a cache. Then, the interpreter generates intermediate data in the case where the sum of the cached value and the number of already interpreted pages managed by the interpreter coincides with a processing-target page number.

8 Claims, 11 Drawing Sheets

```
%!PS-Adobe-3.0
newpath
100 100 moveto       ⎫
500 700 lineto       ⎬ Page 1
stroke               ⎪
showpage             ⎭ true 0 startjob 0 0 0 setrgbcolor         ⎫
/Times-Roman findfont 64  ⎪
scalefont setfont         ⎬ Page 2
100 600 moveto            ⎪
(I am a string.) show     ⎪
showpage                  ⎭

300 400 translate                    ⎫
144 144 scale                        ⎬ Page 3
8 8 1 [8 0 0 8 0 0]{<c936>} image    ⎪
showpage                             ⎭

100 600  moveto            ⎫
(I am a string.) show      ⎬ Page 4
showpage                   ⎭
```

PRINT DATA PROCESSING APPARATUS

BACKGROUND OF THE INVENTION

Field of the Invention

The present invention relates to processing to interpret print data.

Description of the Related Art

A printing apparatus interprets print data (PDL data) described in a page description language (PDL) and temporarily generates intermediate data based on interpretation results. Then, the printing apparatus generates an image from the intermediate data and prints the generated image. Japanese Patent Laid-Open No. 2013-14039 has disclosed a printing apparatus that parallelly interprets individual pages in print data and generates intermediate data.

In the case where individual pages in the print data are interpreted parallelly, a plurality of data interpretation units configured to parallelly interpret pages and a control unit configured to notify the plurality of data interpretation units of pages for which intermediate data should be generated are made use of. Specifically, following the start of a print job, each data interpretation unit starts to interpret print data in order from the top page and manages the number of already interpreted pages. On the other hand, the control unit notifies each data interpretation unit of each individual page number for which intermediate data should be generated while incrementing the number of a page (page number) for which intermediate data should be generated in the order of 1, 2, 3, . . . from the start of the print job. For example, the control unit notifies a certain data interpretation unit of the page number "1", and then notifies the next data interpretation unit of the page number "2". Then, on the completion of the interpretation of a certain page, each data interpretation unit generates intermediate data of the page in the case where the number of already interpreted pages managed by each data interpretation unit itself and the notified page number coincide with each other. Then, the page for which intermediate data is generated is printed.

In print data, there exists a command to reset the number of already interpreted pages managed by a data interpretation unit even on the way of a print job. An example of such a command is startjob in PostScript (registered trademark). The command such as this is called a page reset command. On detecting (interpreting) a page reset command, the data interpretation unit resets the number of already interpreted pages managed by the data interpretation unit itself to "0". The number of already interpreted pages described here refers to a page counter within the data interpretation unit and the value of the page counter is used for printing the number of pages in accordance with the setting of the printing apparatus. For example, by resetting the number of pages, it is made possible to allocate the same page number to individual pages within the same print job. For example, by including the page reset command in the second page of the print data, it is made possible to allocate the page number "1" to the first page of the print data and the page including the page reset command (i.e., the second page of the print data).

In the case where the above-described page reset command is included in the print data, with a printing apparatus using a conventional data interpretation unit and a control unit, such a problem occurs that a page including the page reset command is not printed. In the conventional data interpretation unit, in the case where a page including the page reset command is interpreted, the number of already interpreted pages managed by the data interpretation unit is reset to "0". However, the control unit does not grasp this and notifies the data interpretation unit of the page number for which intermediate data should be generated. As a result of this, there occurs inconsistency between the page number notified by the control unit in order to cause a certain data interpretation unit to generate intermediate data and the number of already interpreted pages managed by the data interpretation unit itself, resulting in that the page including the page reset command is not printed. For example, the control unit notifies a data interpretation unit X of the page number "2" in order to cause the data interpretation unit X to generate intermediate data of the second page of the print data. Here, in the case where the page reset command is included in the second page of the print data, the number of already interpreted pages managed by the data interpretation unit X is reset to "0" at the time of detecting the page reset command. Then, the data interpretation unit X starts interpretation of the second page of the print data that follows the page reset command. However, the number of already interpreted pages managed by the data interpretation unit X has been reset, and therefore, at the time of the completion of the interpretation of the second page of the print data, the number of already interpreted pages managed by the data interpretation unit X is "1", not "2". Because of this, the number of already interpreted pages "1" does not coincide with the notified page number "2" notified by the control unit, and therefore, the intermediate data of the second page of the print data is not generated. As a result of this, the second page of the print data is not printed.

SUMMARY OF THE INVENTION

The print data processing apparatus according to the present invention is a print data processing apparatus including: a plurality of interpretation units each having a data interpretation unit configured to interpret print data, a generation unit capable of generating intermediate data of the print data based on interpretation by the data interpretation unit, and a first holding unit configured to hold a number of pages already interpreted by the data interpretation unit; and a notification unit configured to notify a corresponding interpretation unit of the plurality of interpretation units of a page number for which intermediate data should be generated, and the interpretation unit further has: a second holding unit configured to hold a kind of number of pages different from the number of pages of the first holding unit; a first processing unit configured to, in a case of detecting a command to invalidate contents interpreted hitherto, update the number of pages held by the second holding unit by adding the number of pages held by the first holding unit at a point in time of detection of the invalidation command to the number of pages held by the second holding unit and reset the number of already interpreted pages held by the first holding unit; and a second processing unit configured to, in a case where a sum of the number of pages held by the first holding unit and the number of pages held by the second holding unit coincides with the page number notified by the notification unit, cause the generation unit to perform generation of the intermediate data.

Further features of the present invention will become apparent from the following description of exemplary embodiments (with reference to the attached drawings).

DESCRIPTION OF THE EMBODIMENTS

In the following, embodiments for embodying the present invention are explained by using the drawings. However, the drawings described in the embodiments are merely exemplary and are not intended to limit the scope of the present invention to those.

(First Embodiment)

In the following, a first embodiment is explained. In the present embodiment, an example is explained in which as a PDL to describe print data, a page non-independent PDL is used. The page non-independent PDL is a PDL capable of describing information for printing processing at any portion of print data striding pages. Consequently, in the case where the page non-independent PDL is interpreted by performing parallel processing using a plurality of data interpretation units, it is necessary for each data interpretation unit to interpret not only a target page for which intermediate data is generated but also pages from the top of print data. In the present embodiment, explanation is given by using PostScript (registered trademark) (hereinafter, referred to as PS) as an example of the page non-independent PDL. The page non-independent PDL is not limited to PS and may be another PDL, such as a PCL.

(Hardware Block Diagram of Image Forming Apparatus)

Figure 1:
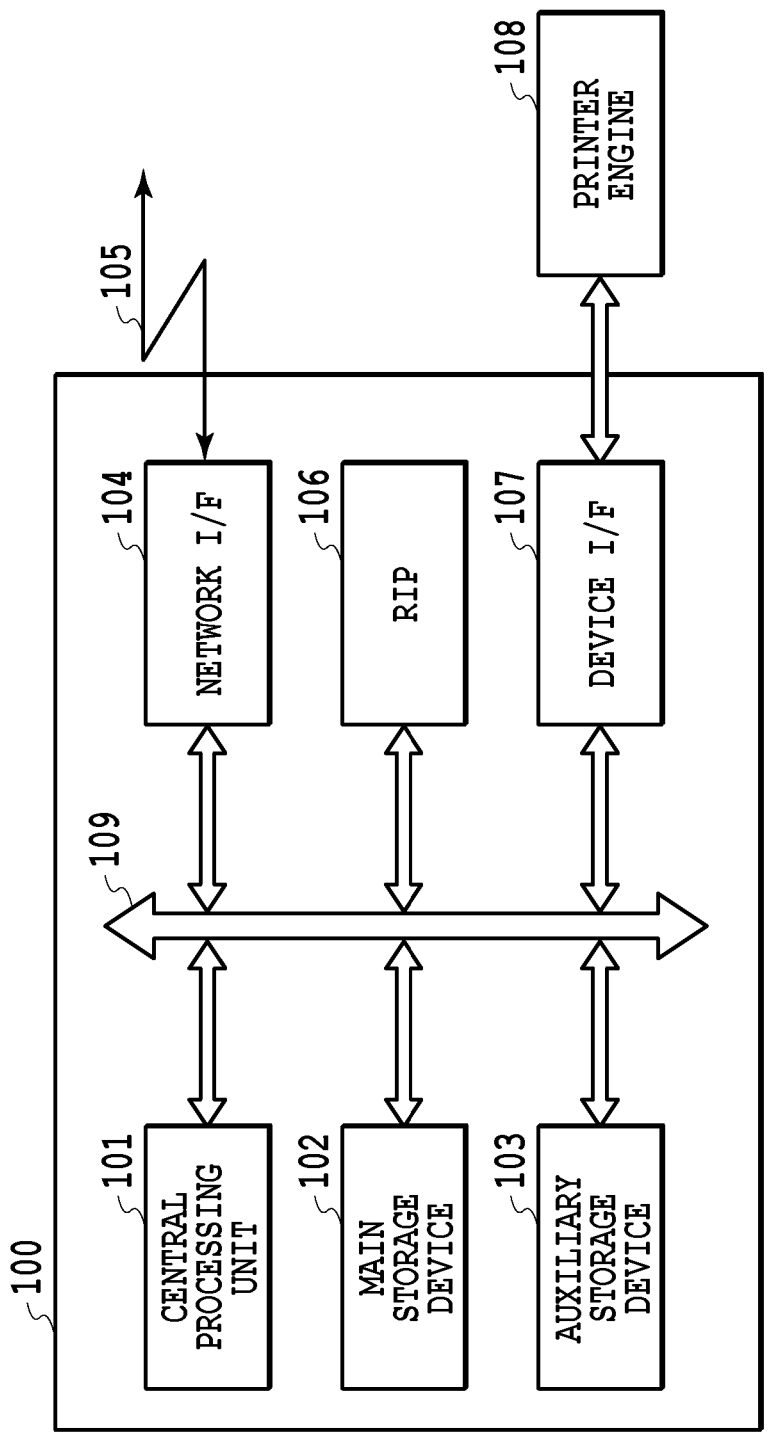
FIG. 1 is a hardware configuration diagram of an image forming apparatus that is used in explanation of a first embodiment.

FIG. 1 is a hardware block diagram explaining a configuration of an image forming apparatus of the present embodiment. The image forming apparatus in FIG. 1 has a controller unit 100. The controller unit 100 controls input/output of an image signal and device information. It may also be possible to call the image forming apparatus a print data processing apparatus and the controller unit 100 a print data processing apparatus.

A central processing unit 101 reads a program stored in an auxiliary storage device 103 onto a main storage device 102 and executes the program. Further, the central processing unit 101 centralizedly controls each device connected to a system bus 109. The central processing unit 101 in the present embodiment implements parallel processing. In order to implement parallel processing, the central processing unit 101 employs a multicore system having a plurality of processors as hardware. Alternatively, it may also be possible to use a microprocessor including a plurality of processor cores. Further, it may also be possible to use one capable making use of a technique, such as hyper threading, to cause one processor to function as, as it were, a plurality of processors by effectively making use of an idle time in the register and the pipeline within the processor.

The main storage device 102 functions as a main memory and a work memory of the central processing unit 101.

The auxiliary storage device 103 is also used for the purpose of holding large-capacity data temporarily or over a long period of time. In the present embodiment, at the time of performing pipeline parallel, data is saved in a buffer area. The main storage device 102 or the auxiliary storage device 103 provides the buffer area.

A Network I/F 104 connects to a network 105 and is in charge of input/output of print data and device information with the outside of the image forming apparatus.

A RIP 106 develops a DL (Display List), which is intermediate data, into a raster image (image data). The RIP 106 performs processing of a DL generated on the main storage device 102 and the auxiliary storage device 103 by the central processing unit 101 at a fast rate and in parallel to the execution of the central processing unit 101.

A device I/F 107 transmits an image signal, gives device operation instructions, and receives device information based on instructions of the central processing unit 101. The controller unit 100 is connected to a printer engine 108 via the device I/F 107.

The printer engine 108 is an output device that outputs an image on a printing medium based on an image signal from the controller unit 100 and may be any of an electrophotographic printer engine and an ink jet printer engine.

(Software Configuration Diagram of Image Forming Apparatus)

Figure 2:
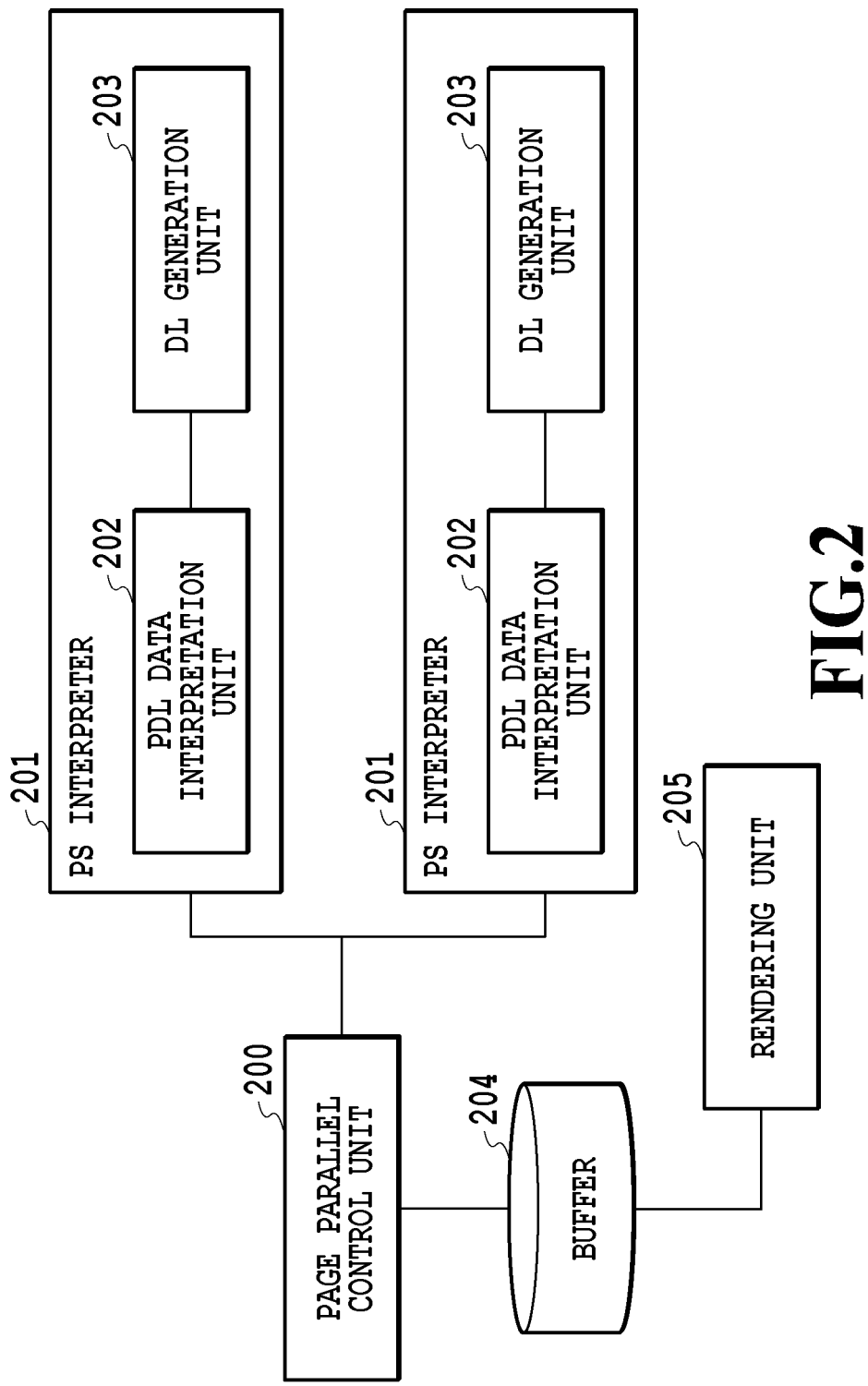
FIG. 2 is a software configuration diagram of the image forming apparatus that is used in explanation of the first embodiment.

FIG. 2 is a software configuration diagram of the image forming apparatus in the present embodiment. Each software module described in FIG. 2 is stored in the auxiliary storage device 103 as a program and loaded onto the main storage device 102 and executed by the central processing unit 101.

A page parallel control unit 200 establishes (activates) a plurality of threads and causes a PS interpreter 201 to operate on each thread. Then, the page parallel control unit 200 controls each thread. In order to perform parallel processing of the printing processing, the page parallel control unit 200 has a processing unit configured to delimit print data into each page and to allocate a processing-target page to each thread. In the present embodiment, a configuration is supposed in which two threads that perform parallel processing are activated, and therefore, in FIG. 2, an example in which the two PS interpreters 201 exist is shown. However, the configuration is not limited to this and it may also be possible to activate threads in the number for which the processor core of the central processing unit 101 can perform parallel control and to allocate the PS interpreter 201 to each of the threads.

The PS interpreter 201 has a PDL data interpretation unit 202 and a DL generation unit 203. The PS interpreter 201 interprets print data and generates a DL (Display List) as intermediate data.

The PDL data interpretation unit 202 is a data interpretation unit configured to interpret description contents of print data described in a page description language (PDL). In the present embodiment, language interpretation of PS is supposed. Further, the PDL data interpretation unit 202 has a holding unit configured to hold a page counter that counts the number of pages already interpreted by the PDL data interpretation unit 202 itself. Furthermore, the PS interpreter 201 has a processing unit configured to perform reset processing, to reset the value of the page counter, and so on, based on the interpretation results of the PDL data interpretation unit 202.

The DL generation unit 203 is capable of generating a DL as intermediate data based on the results of the interpretation by the PDL data interpretation unit 202. There are a case where the DL generation unit 203 generates a DL and a case where DL generation unit 203 does not generate a DL. Details will be described later.

A buffer 204 buffers DLs generated by a plurality of PS interpreters 201. Employment of the page parallel technique sometimes leads to a case where the order of the completion of the processing of each thread is not the order of page and the processing of a certain page is completed earlier than the processing of another page that precedes the certain page. The reason is that there is a case where while a time is taken to generate a DL for a page having a large amount of description contents and a page having complicated description contents, a time is not taken to generate a DL for a page having a small amount of description contents. It is necessary for print data to be output to the RIP 106 in the order of page, and therefore, as a buffer area until the completion of an unprocessed page, the buffer 204 is used. In the present embodiment, part of the main storage device 102 is secured as a buffer area. However, in the case where there is not an area large enough to buffer in the main storage device 102, it may also be possible to use part of the auxiliary storage device 103 as an alternative area.

A rendering unit 205 sends the DL stored in the buffer 204 to the RIP 106 shown in FIG. 1.

(Description Example and Drawing Contents of Print Data)

Figures 3A, 3B:
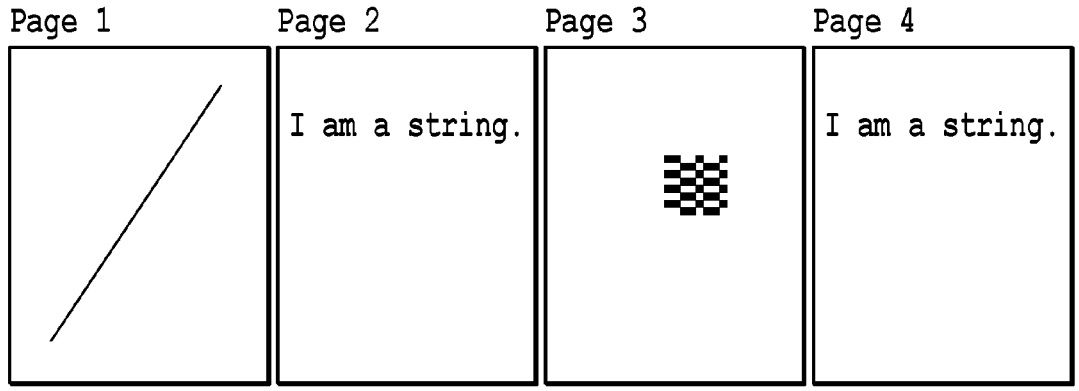
FIG. 3A and FIG. 3B show a description example of print data and drawing contents that are used in explanation of the first embodiment.

FIG. 3A and FIG. 3B show a description example of a drawing object described in print data and drawing contents thereof. FIG. 3A is an example of the description example of print data using PostScript (registered trademark). In the portion of Page 1, an oblique segment is defined. In the portion of Page 2, a character string "I am a string." is defined. In the portion of Page 3, a checkered pattern object is defined. In the portion of Page 4, a character string "I am a string." is defined as in the portion of Page 2. At the boundary of pages of PostScript, a "showpage" command (operator) is inserted. The PDL command to reset the number of already interpreted pages is the "startjob" command of PS in the example shown in FIG. 3A and is described following the "showpage" command of Page 1. Consequently, for the sake of formality, startjob is described at the top of Page 2. The startjob command is a command (page reset command) to reset the contents of the job interpreted hitherto and to start a new job from the description after the startjob command. That is, in the page non-independent language, interpretation is performed in the form in which not only the page currently being interpreted but also the contents described in the pages interpreted hitherto are accumulated, and the startjob command is a command to reset the accumulated contents once. In the example shown in FIG. 3A, the portions except for the page reset command are the substantial description contents of the second page of the print data. For more information about the description specifications of startjob, see the reference manual of PostScript (registered trademark), which is a disclosed document.

FIG. 3B shows the drawing contents of the drawing object described in FIG. 3A. As the contents of the data, four pages are described. However, as described previously, between Page 1 and Page 2, startjob is described. Because of this, the number of pages already interpreted by the PDL data interpretation unit 202 is reset internally at the point in time of the detection (interpretation) of startjob.

In order to simplify explanation, the example as shown in FIG. 3B is explained, in which one page of the logical page corresponds to one page of the physical page. In the case where Nup printing is performed in which N pages of the logical page correspond to one page of the physical page, the number of already interpreted pages counted by a page counter, which is managed by each PDL data interpretation unit 202, is the number of logical pages.

In the example shown in FIG. 3B, the number of pages of the print data is four. In the case where the print data is viewed as a whole, the allocation of the page number will be as shown in FIG. 3B. On the other hand, in the case where the print data is viewed from the PDL data interpretation unit 202 having detected (interpreted) the page reset command, both Page 1 and Page 2 in FIG. 3B are interpreted as the first page as the page number. In order to distinguish between the page number in the case where the print data is viewed as a whole and the page number in the case where the print data is viewed from the PDL data interpretation unit 202, in the following, the page number in the case where the print data is viewed as a whole is represented as the third page of the print data or the like. On the other hand, the page number in the case where the print data is viewed from the PDL data interpretation unit 202 is represented as the third page being interpreted (or already interpreted) or the like.

(Sequence of Page Parallel Processing)

The present embodiment targets page parallel processing in the case where PS capable of page non-independent description is employed as a page description language of print data. With PS, it is possible to describe information for printing processing at any portion of the print data striding pages. Because of this, in the case where the page parallel technique is employed for the printing processing of PS, it is necessary for the PDL data interpretation unit 202 of each thread for performing multithread processing to interpret the language of the data from the top of the data.

Figure 4:
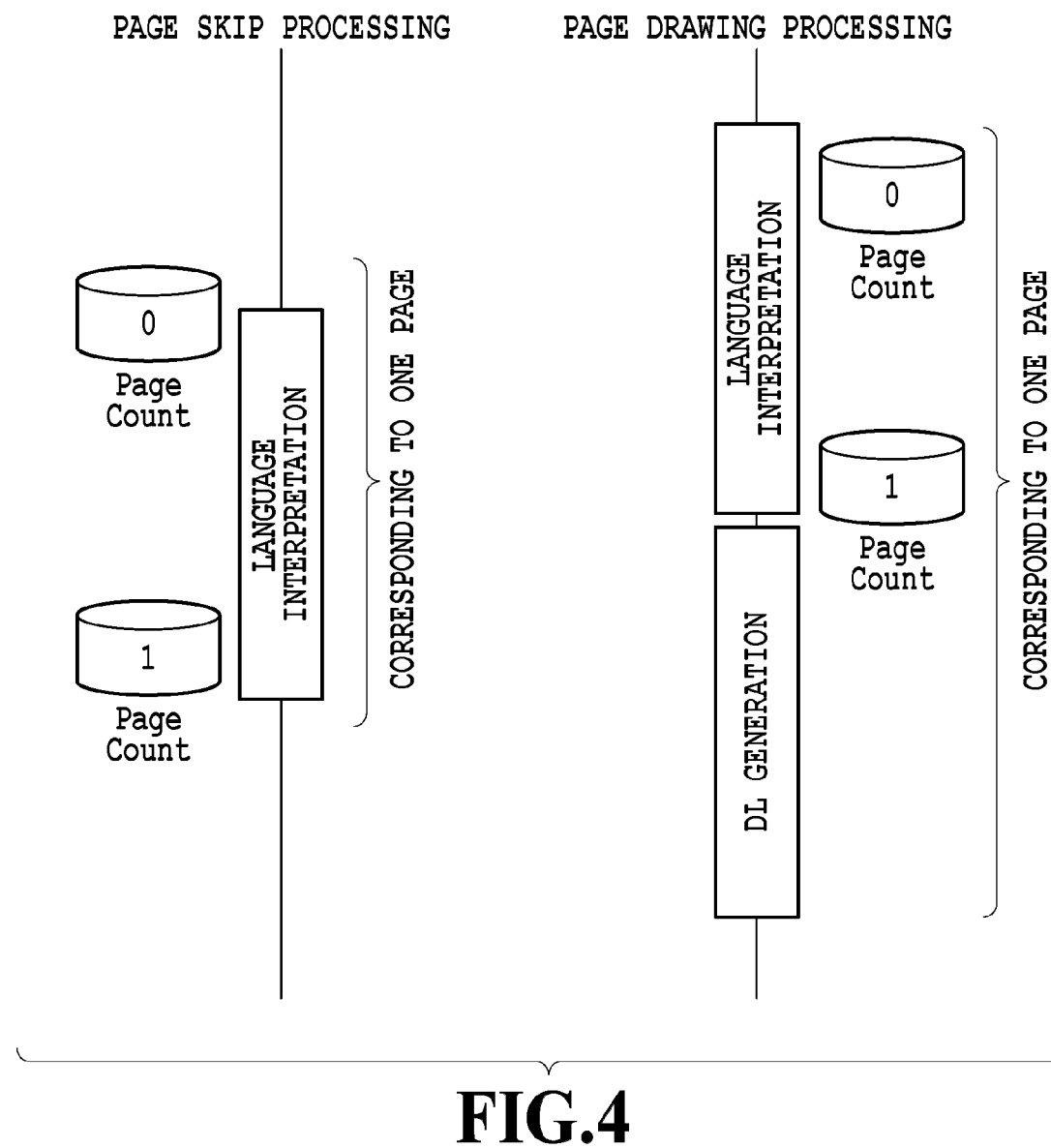
FIG. 4 is a diagram explaining page skip processing and page drawing processing that are used in explanation of the first embodiment.

In the present embodiment, as shown in FIG. 4, the PS interpreter 201 performs the processing in two operation modes. The first one is page skip processing. In the page skip processing, the PS interpreter 201 performs language interpretation processing using the PDL data interpretation unit 202. The other one is page drawing processing. In the page drawing processing, the PS interpreter 201 performs both the language interpretation processing using the PDL data interpretation unit 202 and DL generation processing using the DL generation unit 203. The page skip processing makes progress fast because the DL generation processing is not performed, and therefore, the processing is performed by the page skip processing until the page immediately before a DL generation-target page is reached. On the other hand, for the DL generation-target page, the PS interpreter 201 performs the processing by the page drawing processing. The language interpretation processing is performed both in the page skip processing and in the page drawing processing. Because of this, the language interpretation processing is performed without exception from the top page of the data to the DL generation-target page, and therefore, it is unlikely that the information necessary for the DL generation-target page becomes insufficient and it is possible to the perform printing processing normally.

On the completion of both the page skip processing and the page drawing processing, the number of already interpreted pages is counted in each PS interpreter 201 by a page counter (hereinafter, PageCount) indicting the number of already interpreted pages. The value of PageCount is set to "0" as the initial value before the language interpretation processing is started, but on the completion of the language interpretation processing without any problem, the value is incremented to "1". For example, on the completion of the interpretation of a page delimiter command as shown by the "showpage" command of Page 1 shown in FIG. 3A, the value of PageCount is incremented to "1".

Figure 5:
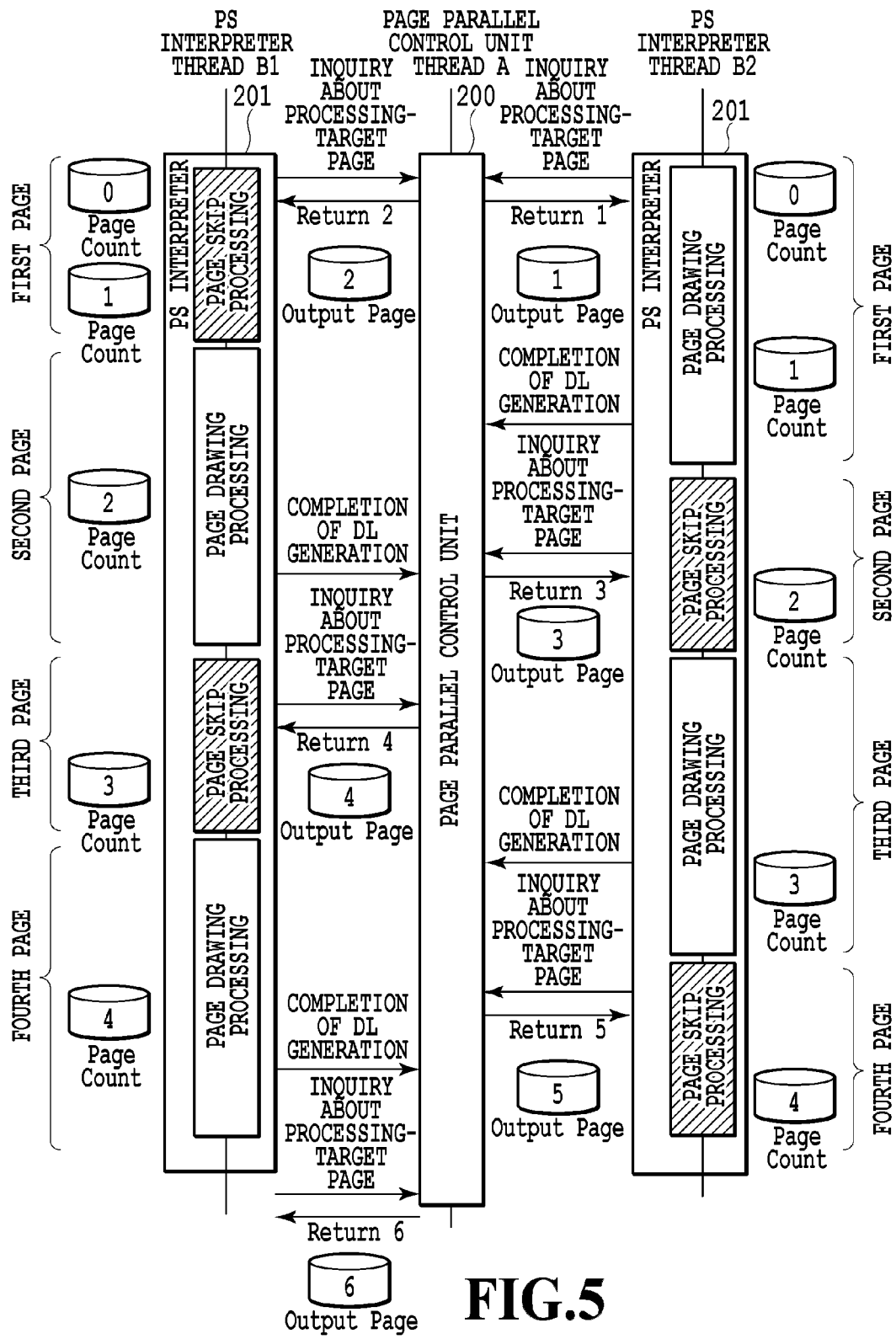
FIG. 5 is a simplified sequence diagram of page parallel processing that is used in explanation of the first embodiment.

FIG. 5 shows a simplified sequence diagram of the page parallel processing. In FIG. 5, an example of the case is shown where processing is performed for common print data not including the page reset command previously described.

By the page parallel control unit 200 activated as a thread A, a thread B1 and a thread B2 are activated and the PS interpreter 201 is allocated to each of the threads B1 and B2. In response to the start of processing, the PS interpreter 201 makes an inquiry to the page parallel control unit 200 about the processing-target page number. At this time, PageCount of each PS interpreter 201 is "0" because the language interpretation processing is not started yet.

The page parallel control unit 200 makes a notification of the DL generation-target page number that is allocated to each thread by taking into consideration the parallelism of each thread. In the example shown in FIG. 5, the thread B1 is first instructed to process the second page and the thread B2 is instructed to process the first page. In the example shown in FIG. 5, the page parallel control unit 200 manages the DL generation-target page number by a parameter "OutputPage" and notifies each PS interpreter 201 of the DL generation-target page number by notifying each PS interpreter 201 of the value of OutputPage. On being notified of OutputPage by the page parallel control unit 200, the PS interpreter 201 performs the page skip processing for the pages up to the page number indicated by OutputPage. Then, the PS interpreter 201 performs the page drawing processing for the page with the page number indicated by OutputPage. That is, the PS interpreter 201 performs the page drawing processing for the page for which the number of already interpreted pages indicated by PageCount and the page number indicated by OutputPage coincide with each other, and performs the page skip processing for the page for which the number of already interpreted pages and the page number do not coincide with each other.

The page number indicated by OutputPage, which is notified to the thread B2, is "1". Consequently, the thread B2 performs the page drawing processing for the first page. Specifically, on the completion of the language interpretation processing, the PS interpreter 201 of the thread B2 increments PageCount managed by the PS interpreter 201 itself to "1". After this, the PS interpreter 201 of the thread B2 compares OutputPage notified by the page parallel control unit 200 with PageCount. Then, in the case where the results of the comparison indicate that both values are the same value, the PS interpreter 201 of the thread B2 continuously performs the DL generation processing of the page with the page number indicated by OutputPage. In this manner, the processing is switched between the page skip processing that is completed by performing only the language interpretation processing and the page drawing processing in which the processing is performed up to the DL generation processing in accordance with the results of the comparison between PageCount and OutputPage at the time of the completion of the language interpretation processing.

On the other hand, the page number indicated by OutputPage, which is notified to the thread B1, is "2". Consequently, the thread B1 performs the page skip processing for the first page and performs the page drawing processing for the second page. This processing is explained in detail. In the thread B1, on the completion of the language interpretation processing of the page skip processing of the first page, the PS interpreter 201 of the thread B1 increments PageCount managed by the PS interpreter 201 itself to "1". Then, the PS interpreter 201 compares OutputPage notified by the page parallel control unit 200 with PageCount. At the point in time of the completion of the language interpretation of the first page, the value of OutputPage is different from that of PageCount. Because of this, the PS interpreter 201 of the thread B1 does not perform the DL generation processing and starts the language interpretation processing of the next page subsequently. On the completion of the language interpretation processing of the page drawing processing of the second page, the PS interpreter 201 of the thread B1 increments PageCount to "2" and compares again OutputPage with PageCount. At the point in time of the completion of the language interpretation of the second page, the value of OutputPage and that of PageCount are the same value, and therefore, the PS interpreter 201 of the thread B1 performs the DL generation processing of the page (here, the second page) for which the interpretation has been completed most recently.

After this, on the completion of the page drawing processing of the first page, the thread B2 notifies the page parallel control unit 200 of the completion of the DL generation and makes an inquiry about the next processing-target page number. In the example shown in FIG. 5, at the timing of the reception of the above-described inquiry from the thread B2, the instructions to process the third page have not yet given. Consequently, the thread B2 is notified of the page number indicating the third page as OutputPage. After this, the PS interpreter 201 similarly makes an inquiry to the page parallel control unit 200 about the DL generation-target page, performs the language interpretation processing, increments the PageCount value, and compares PageCount with OutputPage, and thus repeats the DL generation determination. Due to this, the processing is continued until the final page is reached while switching between the page skip processing and the page drawing processing, and thereby, the page parallel processing is implemented.

Figure 6:
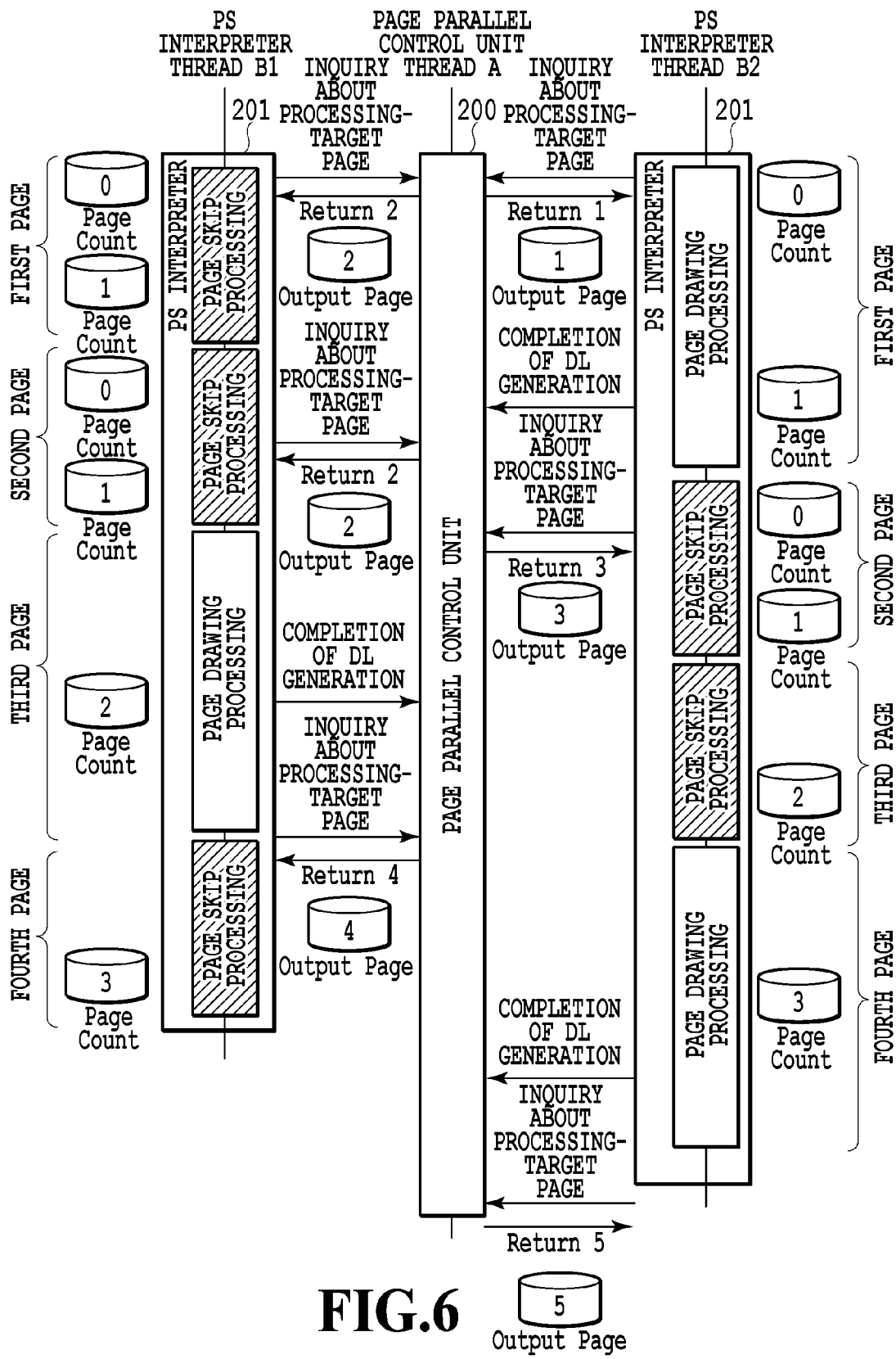
FIG. 6 is a simplified sequence diagram of page parallel processing in the prior art.

FIG. 6 shows a simplified sequence diagram of the page parallel processing in the prior art in the case where startjob is included between the first page and the second page as shown in FIG. 3A. As in the example shown in FIG. 5, the thread B1 and the thread B2 are activated by the page parallel control unit 200 and the PS interpreter 201 is allocated to each thread. Each thread is notified of OutputPage in order by the page parallel control unit 200, but in the example shown in FIG. 6, as in the print data shown in FIG. 3A, startjob exists after "Showpage" of the first page, i.e., at the top of the second page. On detecting (interpreting) the page reset command, such as startjob, the PS interpreter 201 resets PageCount managed by each PS interpreter 201 to "0". On the other hand, the page parallel control unit 200 does not grasp that PageCount has been reset by the PS interpreter 201, and therefore, the page parallel control unit 200 notifies the PS interpreter 201 of the value of OutputPage that does not take the reset into consideration as it is.

In the example shown in FIG. 6, on starting the job, the thread B1 is notified of OutputPage indicating "2" as the page number by the page parallel control unit 200. Consequently, the PS interpreter 201 of the thread B1 performs the processing of the first page by the page skip processing and increments PageCount to "1". After this, startjob is detected by the language interpretation processing of the second page, and therefore, the PS interpreter 201 of the thread B1 resets PageCount managed by the PS interpreter 201 itself to "0". As described previously, startjob is a command to initialize and invalidate the contents or the like defined hitherto by the job. Consequently, the PS interpreter 201 of the thread B1 performs the same operation as the processing of the first page. That is, the PS interpreter 201 of the thread B1 makes an inquiry to the page parallel control unit 200 about the processing-target page. However, the page parallel control unit 200 does not take the reset into consideration. Because of this, the page parallel control unit 200 is not notified of the completion of the generation of OutputPage "2" notified to the thread B1, and therefore, the page parallel control unit 200 notifies the thread B1 of "2" as OutputPage again. In the thread B1, in the processing of the second page of the print data, PageCount at the point in time of the completion of the language interpretation processing is "1", which does not coincide with "2" of OutputPage. Consequently, in the thread B1, the page skip processing is performed for the second page of the print data, and therefore, the DL generation is not performed.

Next, the processing of the other thread B2 is explained. On starting a job, the thread B2 is notified of "1" as OutputPage by the page parallel control unit 200. Because of this, for the first page, the page drawing processing is performed and PageCount is incremented to "1". After this, in response to an inquiry by the PS interpreter 201 of the thread B2 to the page parallel control unit 200 about OutputPage, "3" is notified. Because of this, the PS interpreter 201 of the thread B2 starts the page skip processing of the second page, which is a page not interpreted yet, in order to perform the page drawing processing of the third page. At this time, startjob is detected at the top of the second page, and therefore, the PS interpreter 201 of the thread B2 resets PageCount managed by the PS interpreter 201 itself to "0". After this, the PS interpreter 201 of the thread B2 makes an inquiry again to the page parallel control unit 200 about OutputPage. At this time, the page parallel control unit 200 does not take the reset into consideration. Consequently, the page parallel control unit 200 has not received yet the notification of the completion of the DL generation of the page with "3" notified to the thread B2, and therefore, the page parallel control unit 200 notifies again the thread B2 of "3" as OutputPage. As a result of this, in the processing of the second page of the print job by the thread B2 also, PageCount and OutputPage do not coincide with each other, and therefore, the second page of the print data is processed by the page skip processing and the DL generation is not performed. Consequently, the second page of the print data is not output onto a printing sheet.

In the subsequent processing, as shown in FIG. 6, the DL is generated in the state where inconsistency in the processing-target page number has occurred. For the pages (the third page of the print data and the subsequent pages) after the page including the page reset command (in the present embodiment, the second page of the print data), although inconsistency in the PS interpreter that performs the processing occurs, the DL itself is generated. Consequently, as a result, a phenomenon occurs in which the printing of the page including the page reset command is not performed. As described above, in the example shown in FIG. 6, the processing is performed in the situation in which the second page is not printed resulting from the inconsistency in the value between PageCount and OutputPage, which is caused by the processing of the page reset command of startjob. Because of this, in the present embodiment, in the PS interpreter 201, it is made possible to obtain the normal output results even for the print data including startjob by resolving this inconsistency.

Figure 7:
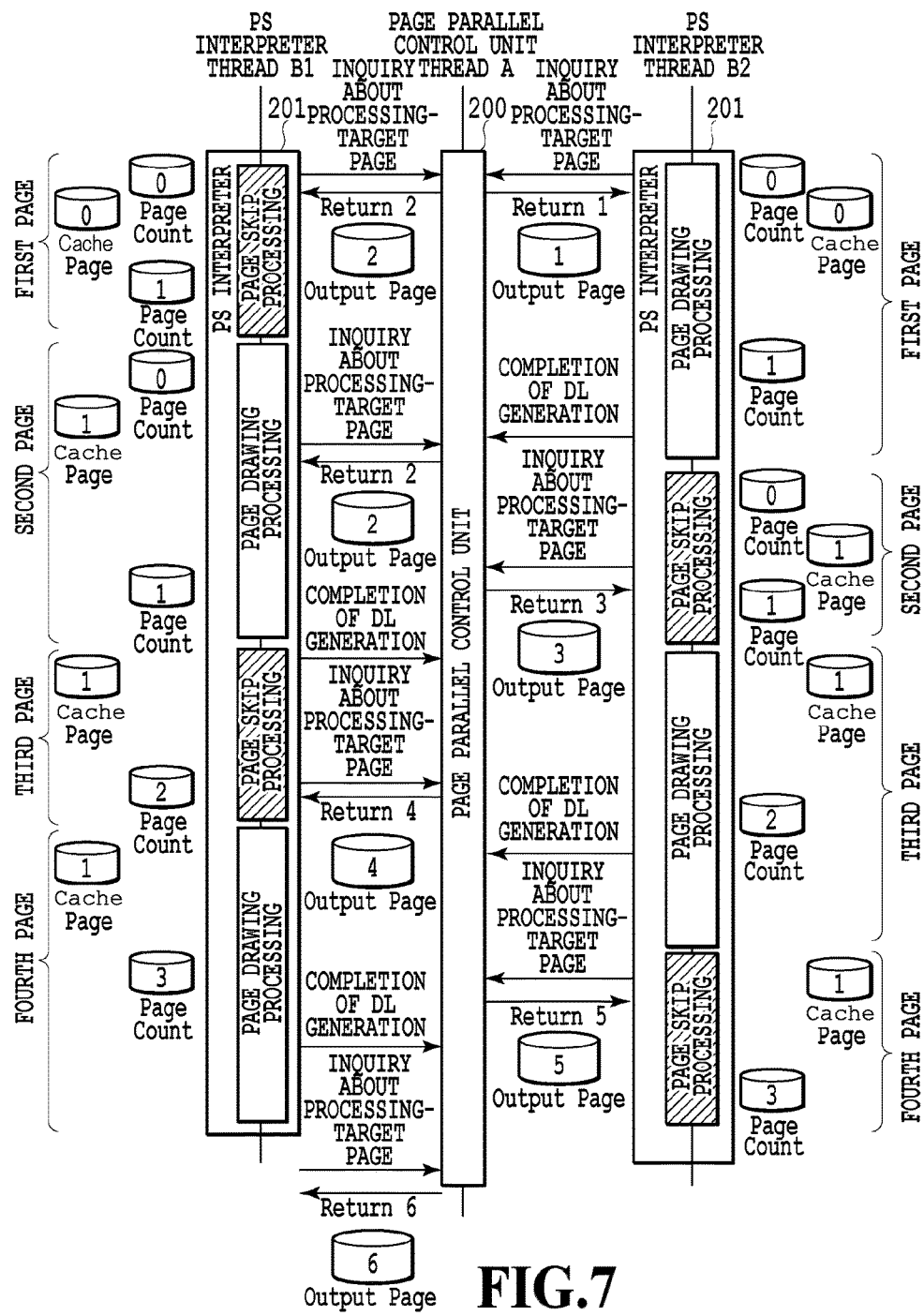
FIG. 7 is a simplified sequence diagram of page parallel control processing in the first embodiment.

FIG. 7 shows a simplified sequence diagram of the page parallel processing in the present embodiment in the case where startjob is included between the first page and the second page as shown in FIG. 3A. Here, the PS interpreter 201 holds not only PageCount but also a page counter value, CachePage. CachePage is a counter value that holds the number of pages for which the language interpretation has already been completed at the time of detecting startjob. That is, CachePage is a counter value holding a kind of number of pages different from that of PageCount. Further, CachePage is not reset even in the case where the previously described page reset command is detected. The difference in the number of pages between PageCount and OutputPage, which results from that the page parallel control unit 200 cannot take the reset into consideration after startjob is detected, is eliminated by CachePage. In the processing shown in FIG. 6, in the case of determining whether to perform the DL generation, the PS interpreter 201 compares OutputPage with PageCount, but in the present embodiment, this comparison processing is changed. Specifically, the PS interpreter 201 of the present embodiment compares the sum of PageCount and CachePage with OutputPage. Then, in the case where both values are the same value, the DL generation processing is performed.

In the processing shown in FIG. 7, the processing of the threads B1 and B2 of the first page of the print data is the same as the processing of the first page shown in FIG. 6. On starting the language interpretation processing of the second page of the print data and detecting startjob, the thread B1 and the thread B2 set the value of PageCount to CachePage and then reset PageCount to "0". In the example shown in FIG. 7, at the timing of the detection of startjob, "1" is set to CachePage.

In the thread B1, at the time of processing the second page of the print data, in which startjob is detected, "2" is notified again as OutputPage by the page parallel control unit 200. In the processing shown in FIG. 7, processing using the sum of PageCount and CachePage is performed. After the language interpretation processing of the second page of the print data, PageCount is incremented, and as a result of this, the sum of PageCount and CachePage is "1"+"1"="2", which is the same value as that of OutputPage. Consequently, the thread B1 performs the DL generation processing of the second page of the print data. As a result of this, the second page of the print data is output onto a printing sheet.

The processing of the other thread B2 is discussed. In the thread B2, at the time of processing the second page of the print data, in which startjob is detected, "3" is notified again as OutputPage by the page parallel control unit 200. On the other hand, after the language interpretation processing of the second page of the print data in the thread B2, PageCount is incremented and becomes "1". That is, the sum of PageCount and CachePage is "1"+"1"="2", which is not equal to OutputPage. Consequently, in the thread B2, the DL generation processing of the second page of the print data is not performed and the page skip processing is performed. After this, in the thread B2, the processing of the third page of the print data is continued and on the completion of the language interpretation processing, PageCount becomes "2". Then, the sum of PageCount and CachePage is "2"+"1"="3", which is equal to OutputPage. Consequently, the DL generation processing is performed. As described above, by setting the case where the sum of PageCount and CachePage becomes equal to OutputPage as the condition to perform the DL generation processing, it is possible to eliminate the difference in the value between OutputPage and PageCount and to normally perform the page parallel processing.

(Control Flow of Page Parallel Control Unit)

Figure 8:
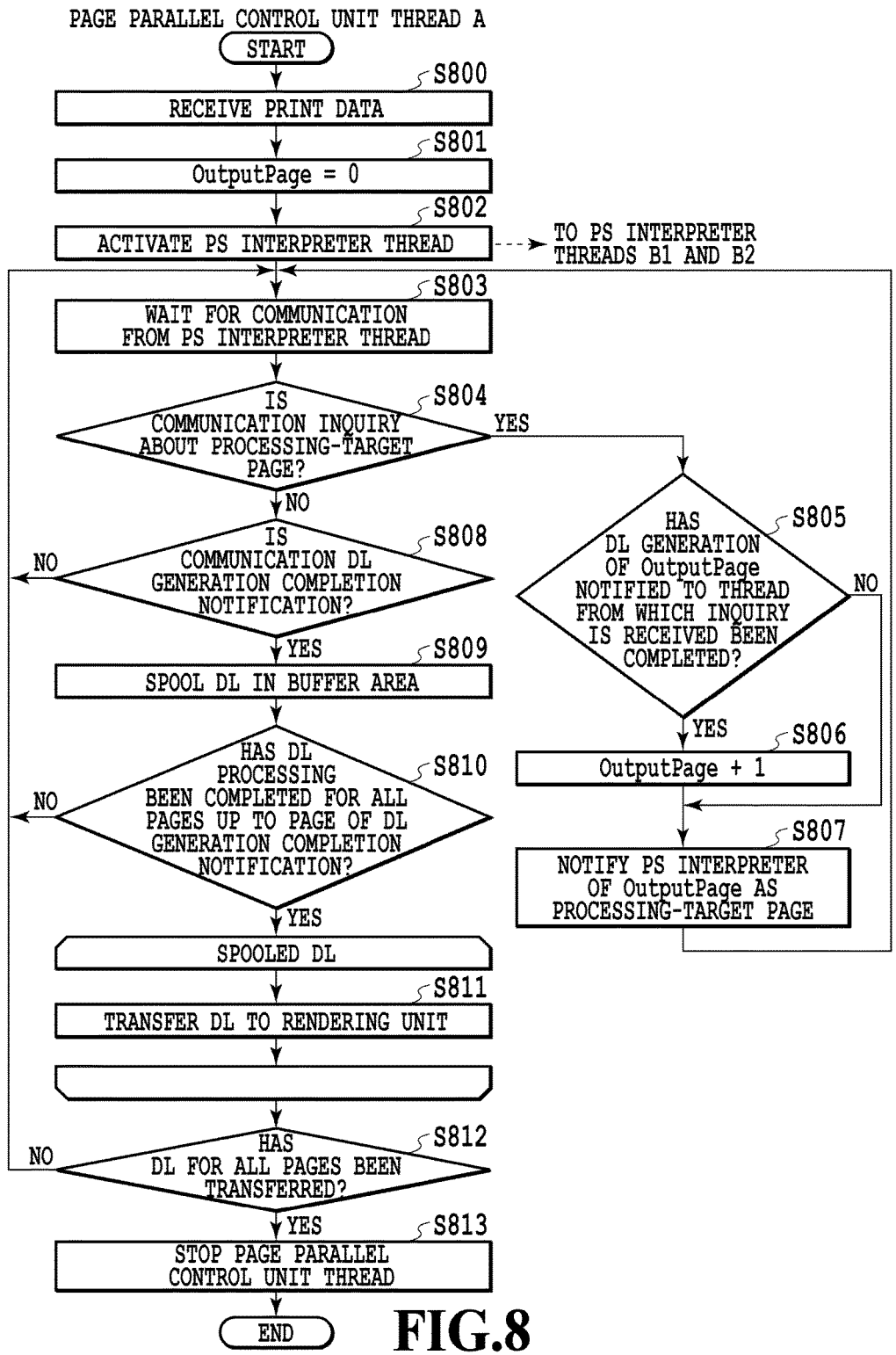
FIG. 8 is a flowchart of a page parallel control unit in the first embodiment.

Next, by using FIG. 8, the page control of the page parallel processing in the page parallel control unit 200 is explained. The page parallel control unit 200 manages OutputPage as a page counter value for page control by the page parallel control unit 200 itself. OutputPage is used to notify the PS interpreter of the processing-target page number for which the DL generation is performed. The value of OutputPage is a value indicating the page number of the print data and the value is held even in the case where there is a page reset command, and therefore, the value of OutputPage can also be said the original page number. In the case where print data is received at the Network I/F 104, the processing shown in FIG. 8 is started by the central processing unit 101. The processing shown in FIG. 8 is implemented by the central processing unit 101 executing the program developed onto the main storage device 102. The central processing unit 101 functions as the page parallel control unit 200 in accordance with the execution of the program.

First, at step S800, the page parallel control unit 200 receives print data.

Next, at step S801, the page parallel control unit 200 sets 0 to OutputPage as initialization processing.

Next, at step S802, the page parallel control unit 200 activates a PS interpreter thread that functions as a PS interpreter. Here, as shown in FIG. 7, the threads B1 and B2 are activated as the PS interpreter 201.

Next, at step S803, the page parallel control unit 200 waits for communication from the PS interpreter 201 activated at step S802. Here, the page parallel control unit 200 waits for communication of an inquiry about the DL generation-target page or a DL generation completion notification from the PS interpreter 201. Upon receipt of the communication of an inquiry or a notification from the thread of the PS interpreter 201, the page parallel control unit 200 advances the processing to step S804.

Next, at step S804, the page parallel control unit 200 determines whether or not the communication received from the PS interpreter 201 at step S803 is an inquiry about a DL generation processing-target page. In the case where the communication is an inquiry about the DL generation processing-target page, the page parallel control unit 200 advances the processing to step S805. In the case where the communication is not an inquiry about the processing-target page, the page parallel control unit 200 advances the processing to step S808.

Next, at step S805, the page parallel control unit 200 determines whether or not the DL generation processing of OutputPage notified to the thread from which the inquiry is received has been completed. The page parallel control unit 200 allocates the DL generation processing-target page to each thread and manages which processing-target page is allocated to which thread. Specifically, the page parallel control unit 200 manages the thread from which the inquiry is received and the value of OutputPage notified to the thread in association with each other. In the case where the DL generation completion notification for OutputPage notified to the thread from which the inquiry is received has not been received yet, the processing proceeds to step S807. In the case where the DL generation completion notification for OutputPage notified to the thread from which the inquiry is received has been received, the processing proceeds to step S806. At step S805, in the case where there is no OutputPage allocated to the thread, i.e., in the case of the processing of the first page, it is assumed that the processing proceeds to step S806.

At step S806, the page parallel control unit 200 updates the value to be notified as the next DL generation processing-target page by adding 1 to OutputPage.

At step S807, the page parallel control unit 200 notifies the thread (here, the PS interpreter 201) from which the inquiry about the processing-target page is received of the value of OutputPage. After this, the page parallel control unit 200 returns the processing to step S803.

In the case of determining that the communication is not an inquiry about the processing-target page at step S804, the page parallel control unit 200 determines whether the communication received from the PS interpreter 201 at S803 is a DL generation completion notification at step S808. In the case where the communication is a DL generation completion notification, the page parallel control unit 200 advances the processing to step S809. In the case where the communication is not a DL generation completion notification, the page parallel control unit 200 returns to step S803 and repeats the processing.

Next, at step S809, the page parallel control unit 200 spools the generated DL in a buffer area of the buffer 204. There is a case where the order of the DL generation by respective threads is reversed, and therefore, the page parallel control unit 200 temporarily spools the generated DLs in the buffer area.

Next, at step S810, the page parallel control unit 200 determines whether the DL generation has been completed for all the page numbers up to the page number of the DL generation completion notification received from the PS interpreter 201 at step S803. In the case where the DL generation has been completed for all the page numbers, the page parallel control unit 200 advances the processing to step S811. In the case where the DL generation has not been completed yet for all the page numbers, the page parallel control unit 200 returns to step S803 and repeats the processing.

Next, at step S811, the page parallel control unit 200 transfers all the DLs spooled in the buffer 204 to the rendering unit 205 in accordance with the page order.

Next, at step S812, the page parallel control unit 200 determines whether the DLs for all the pages included in the print data have been transferred. It is possible to perform this determination by, for example, determining whether or not both the thread B1 and the thread B2 activated at step S802 are stopped. In the case where the DLs for all the pages included in the print data have been transferred, the page parallel control unit 200 advances the processing to step S813. In the case where the DLs for all the pages included in the print data have not transferred yet, the page parallel control unit 200 returns to step S803 and repeats the processing.

Next, at step S813, the page parallel control unit 200 stops the thread A, which is the thread of the page parallel control unit 200 itself, and terminates the present processing.

By the above processing, the page control of the page parallel processing by the page parallel control unit 200 is performed.

(Flow of Parallel DL Generation Control of PS Interpreter)

Figure 9:
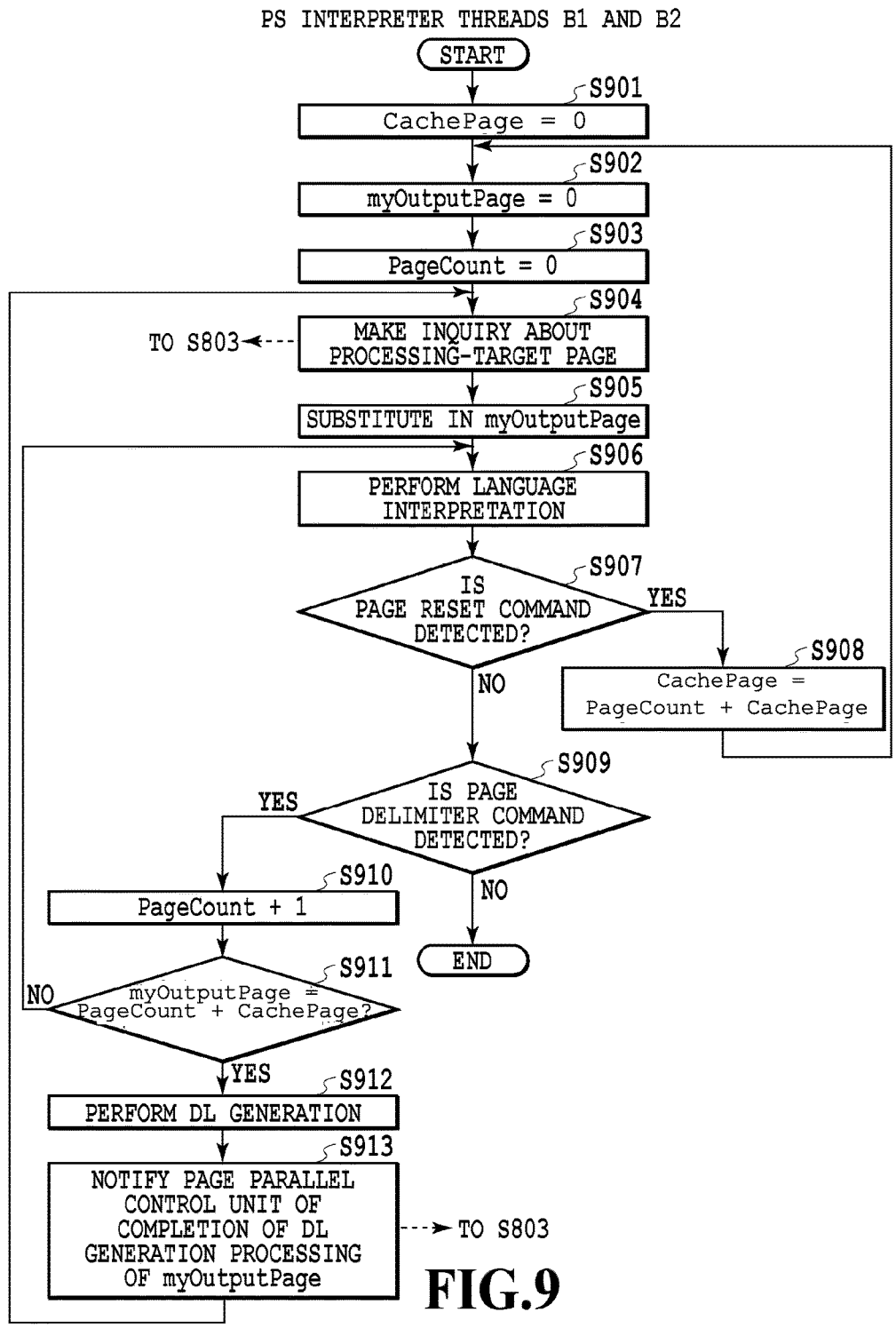
FIG. 9 is a flowchart of an interpreter in the first embodiment.

Next, by using a flowchart shown in FIG. 9, a flow of parallel DL generation control in the threads B1 and B2 of the PS interpreter 201 is explained. These threads are those activated by the page parallel control unit 200 in the processing at step S802 shown in FIG. 8. Then, the processing shown in FIG. 9 is the processing of each thread after the thread is activated as the PS interpreter 201 by the page parallel control unit 200. First, a general outline of the processing shown in FIG. 9 is explained.

The PS interpreter 201 has three counter values, i.e., PageCount, CachePage, and myOutputPage as page counters managed by the PS interpreter 201 itself. PageCount is a counter value storing the value indicating the number of pages for which the language interpretation has already been completed by the PS interpreter 201 as already explained. CachePage is a counter value storing the value of the number of pages for which the language interpretation has already been completed at the point in time of the detection of a PDL command, such as startjob, which resets PageCount (i.e., the value of PageCount at that point in time). The value stored in CachePage is updated by adding the value of PageCount to the value stored in CachePage. Further, myOutputPage is a counter value internally storing the value indicated by OutputPage at the time of the notification of OutputPage explained in FIG. 8 by the page parallel control unit 200. Of these counter values, CachePage is a counter value that is continued to hold the value even in the case where a page reset command is detected.

Upon receipt of the processing-target page number (OutputPage) from the page parallel control unit 200, the PS interpreter 201 stores the value in myOutputPage and starts processing. Then, while the sum of PageCount and CachePage is smaller than myOutputPage, the PS interpreter 201 performs only the language interpretation processing while incrementing PageCount (i.e., performs page skip processing). In the case where the sum of PageCount and CachePage becomes equal to myOutputPage, the PS interpreter 201 performs the language interpretation and the DL generation (i.e., page drawing processing). On the completion of the DL generation, the PS interpreter 201 notifies the page parallel control unit 200 of the completion along with the page number for which the DL generation has been performed and makes an inquiry to the page parallel control unit 200 about the next processing-target page number.

On detecting startjob, the PS interpreter 201 sets the sum of PageCount and CachePage to CachePage and resets the value of PageCount to "0". After this, the PS interpreter 201 makes again an inquiry to the page parallel control unit 200 about the processing-target page number and repeats the processing. The value of PageCount is reset in the case where startjob is detected, but the value of PageCount before the reset is held in CachePage. Consequently, it is possible for the PS interpreter 201 to resolve the inconsistency in page by using the sum of PageCount and CachePage at the time of determining whether to perform the DL generation for a page in processing.

In the following, the flowchart shown in FIG. 9 is explained. In the case where the threads B1 and B2 are established by the page parallel control unit 200 at step S802 shown in FIG. 5, the present processing is started.

First, at step S901, the PS interpreter 201 sets CachePage of the page counter value to 0 as the initialization processing. At step S902, the PS interpreter 201 sets myOutputPage of the page counter value to 0 as the initialization processing. At step S903, the PS interpreter 201 sets PageCount of the page counter value to 0 as the initialization processing.

Next, at step S904, the PS interpreter 201 makes an inquiry to the page parallel control unit 200 about the page number of the DL generation processing-target page. On being notified of the page number (OutputPage) of the processing-target page by the page parallel control unit 200, the PS interpreter 201 advances the processing to step S905.

Next, at step S905, the PS interpreter 201 stores the value of the page number of the DL generation-target page notified at step S904 in myOutputPage of the internal page counter value.

Next, at step S906, the PS interpreter 201 performs the language interpretation processing of the print data by the PDL data interpretation unit 202. This language interpretation processing is performed until the page reset command or the page delimiter command is detected.

Next, at step S907, the PS interpreter 201 determines whether the page reset command, such as startjob, which resets PageCount has been detected as the results of performing the language interpretation at step S906. In the case of not having detected the page reset command, the PS interpreter 201 advances the processing to step S909. In the case of having detected the page reset command, the PS interpreter 201 advances the processing to step S908.

Next, at step S908, the PS interpreter 201 updates the value of CachePage. As described previously, in the case of having detected startjob, the PS interpreter 201 has to reset PageCount, which is the internal number of pages control value. In the present embodiment, by storing the value of PageCount before the reset in CachePage in view of the reset, the difference from the value of OutputPage managed by the page parallel control unit 200 is eliminated. There is also a case where a plurality of page reset commands is included in the print data, and therefore, in the processing at step S908, the processing to update the value obtained by adding the value of PageCount to the value of CachePage until that point in time as the value of CachePage is performed. Then, the PS interpreter 201 returns the processing to step S902.

On the other hand, at step S909, the PS interpreter 201 determines whether the page delimiter command has been detected as the results of performing the language interpretation. The page delimiter command corresponds to the command (operator), such as showpage, erasepage, and copypage, in PS. In the case of having detected the page delimiter command, the PS interpreter 201 advances the processing to step S910. In the case of not having detected the page delimiter command, this means that the final end of the PDL data has been reached, and therefore, the PS interpreter 201 terminates the processing.

At step S910, the PS interpreter 201 updates the counter value by adding 1 to the value of PageCount.

At step S911, the PS interpreter 201 determines whether the value of myOutputPage is equal to the sum of PageCount and CachePage. In the processing at step S911, whether the page for which the language interpretation has been completed through the processing at step S906 is the DL generation processing-target page (OutputPage) notified by the page parallel control unit 200 is determined. In the case where both are equal, the PS interpreter 201 determine that the page for which the language interpretation has been completed by the processing at step S906 is the DL generation processing-target page and advances the processing to step S912. In the case where both are not equal, the PS interpreter 201 returns to step S906 and repeats the processing.

Next, at step S912, the PS interpreter 201 performs the DL generation processing of the page for which the language interpretation has been completed by the processing at step S906 by using the DL generation unit 203.

Next, at step S913, the PS interpreter 201 notifies the page parallel control unit 200 that the DL generation processing of myOutputPage has been completed.

By the above processing, the parallel DL generation control in the threads B1 and B2 by the PS interpreter 201 is performed.

As explained above, the image forming apparatus including the central processing unit 101 that employs the multi-core system in the present embodiment performs the printing processing by multithread. On detecting a PDL command that instructs page reset at the time of performing the printing processing, the image forming apparatus stores the page counter value before the reset in the internal cache value and continues the subsequent processing. In the case where whether to perform the DL generation is determined after the reset of the internal page counter value, by making use of the cache value in the determination processing, it is possible to eliminate the difference in the internal page counter value between the page parallel control unit 200 and the PS interpreter 201. Due to this, it is possible to avoid the inconsistency in page control in the case where the print data including the page reset command is processed. Further, the internal page counter value itself is reset in accordance with the page reset command, and therefore, it is possible to cope with the case where, for example, printing is performed by using the same page number in plurality within the same job.

(Modification Example)

In the first embodiment, the example is explained in which each PS interpreter 201 holds CachePage and the inconsistency in the number of pages is resolved. In the modification example, it may also be possible for the page parallel control unit 200 to hold the counter value corresponding to CachePage and the inconsistency may be resolved by the control on the page parallel control unit 200 side. In this case, the page parallel control unit 200 is notified of the value of PageCount at the point in time of the detection of startjob by the PS interpreter 201. Then, in the page parallel control unit 200, the value of PageCount notified by the PS interpreter 201 is set to CachePage managed by the page parallel control unit 200 itself. At this time, the page parallel control unit 200 resets OutputPage notified to the PS interpreter 201 that is the source of the notification of the value of PageCount. That is, upon receipt of an inquiry again about the processing-target page from the PS interpreter 201 that is the source of the notification of the value of PageCount, the page parallel control unit 200 notifies the PS interpreter 201 of the value obtained by subtracting the value of CachePage from the value of OutputPage. On the PS interpreter 201 side, it is only necessary to perform processing to notify the page parallel control unit 200 of the value of PageCount at the point in time of the detection of startjob by the PS interpreter 201. That is, on the PS interpreter 201 side, it is only necessary to perform processing to compare the PageCount value with OutputPage and to perform the DL generation processing for the page for which both values are equal. As described above, by the control on the page parallel control unit 200 side, it is also possible to avoid the inconsistency in the case where the page parallel control is performed.

(Second Embodiment)

In the first embodiment, the example is explained in which the difference itself in the internal page counter value between the page parallel control unit 200 and the PDL data interpretation unit 202 is held as the cache value. Then, the processing to resolve the inconsistency performed by the page parallel control unit 200 or the PDL data interpretation unit 202 is explained. In the present embodiment, explanation is given to processing to ignore the specification of the page reset command in place of holding the difference in the page counter value therebetween, to provide a page counter value to count the total number of pages, and to use the value in determination of whether or not to perform the DL generation. That is, in the second embodiment, an example is explained in which a page counter to count the total number of pages, which is not affected by the specification of the page reset command, is used in place of the cache value. The counter value to count the total number of pages is explained as TotalPage.

(Sequence of Page Parallel Processing)

Figure 10:
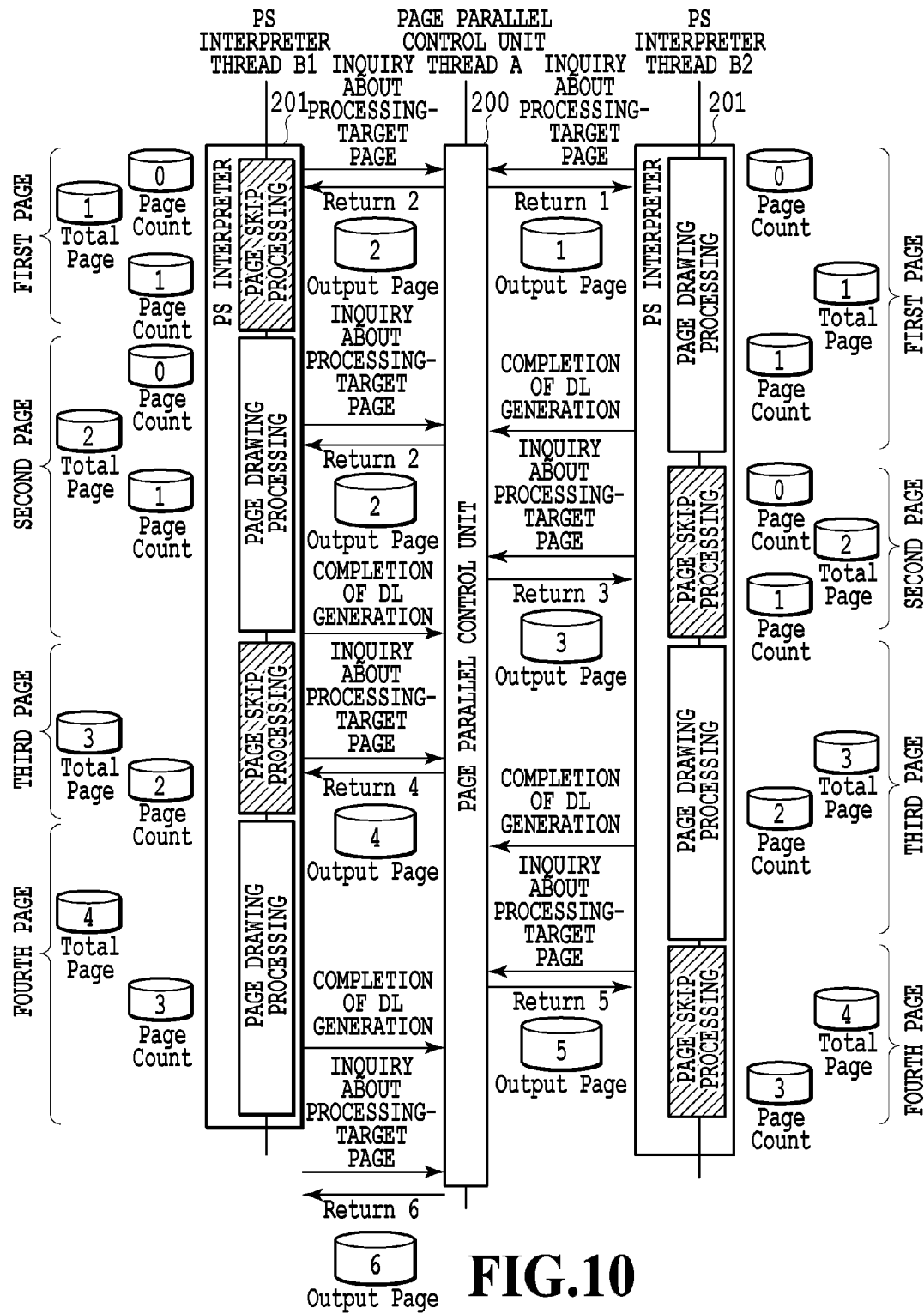
FIG. 10 is a simplified sequence diagram of page parallel processing in a second embodiment.

FIG. 10 is a simplified sequence diagram in the second embodiment. In the present embodiment also, explanation is given by using an example in which startjob is included between the first page and the second page as in the print data explained in FIG. 3A. The threads B1 and B2 are notified of "2" and "1", respectively, as OutputPage by the page parallel control unit 200. Each PS interpreter 201 corresponding to each thread performs the language interpretation processing until the DL generation of the page specified by OutputPage is performed. In the present embodiment, in the case of determining whether or not to perform the DL generation of the page currently in processing, the PS interpreter compares TotalPage managed by the PS interpreter itself with OutputPage and performs the DL generation in the case where both are equal. Like PageCount, TotalPage is incremented each time the language interpretation processing is completed, but the counter value is not reset even in the case where the page reset command, such as startjob, is detected.

The thread B1 is notified of "2" as OutputPage by the page parallel control unit 200. On the completion of the language interpretation processing of the first page, the thread B1 increments both TotalPage and PageCount to "1" and "1", respectively. In order to determine whether or not to perform the DL generation, OutputPage is compared with TotalPage, but both are not the same value, and therefore, the thread B1 does not perform the DL generation of the first page. Because startjob exists between the first page and the second page, the thread B1 resets the value of PageCount before starting the processing of the second page, but does not reset the value of TotalPage. Then, the thread B1 performs the language interpretation processing of the second page and increments PageCount and TotalPage to "1" and "2", respectively. At this time, the thread B1 is notified again of "2" as OutputPage by the page parallel control unit 200. The thread B1 performs the DL generation processing because TotalPage is "2", which is the same value as the value of OutputPage.

On the other hand, the thread B2 is notified of "1" as OutputPage by the page parallel control unit 200. On the completion of the language interpretation processing of the first page, the thread B2 increments TotalPage and PageCount to "1" and "1", respectively. In order to determine whether to perform the DL generation, the thread B2 compares OutputPage with TotalPage. Then, both values are the same value, and therefore, the thread B2 performs the DL generation of the first page. Because startjob exists between the first page and the second page, the thread B2 also resets the value of PageCount before starting the processing of the second page, but does not reset the value of TotalPage. Then, the thread B2 performs the language interpretation processing of the second page and increments PageCount and TotalPage to "1" and "2", respectively. At this time, the thread B2 is notified of "3" as OutputPage by the page parallel control unit 200. TotalPage is "2" and the value of OutputPage is not the same as that of TotalPage, and therefore, the DL generation is not performed (page skip processing). Subsequently, the thread B2 starts the language interpretation processing of the third page. On the completion of the language interpretation processing of the third page, the thread B2 increments both the values of TotalPage and PageCount to "2" and "3", respectively. Here, the comparison between OutputPage and TotalPage indicates that both values are the same value, and therefore, the thread B2 performs the DL generation.

As described above, by setting the case where the value of TotalPage that is not affected by the page reset command becomes equal to the value of OutputPage to the condition to perform the DL generation processing, it is possible to normally perform the page parallel processing.

(Flow of Parallel DL Generation Control of PS Interpreter)

Figure 11:
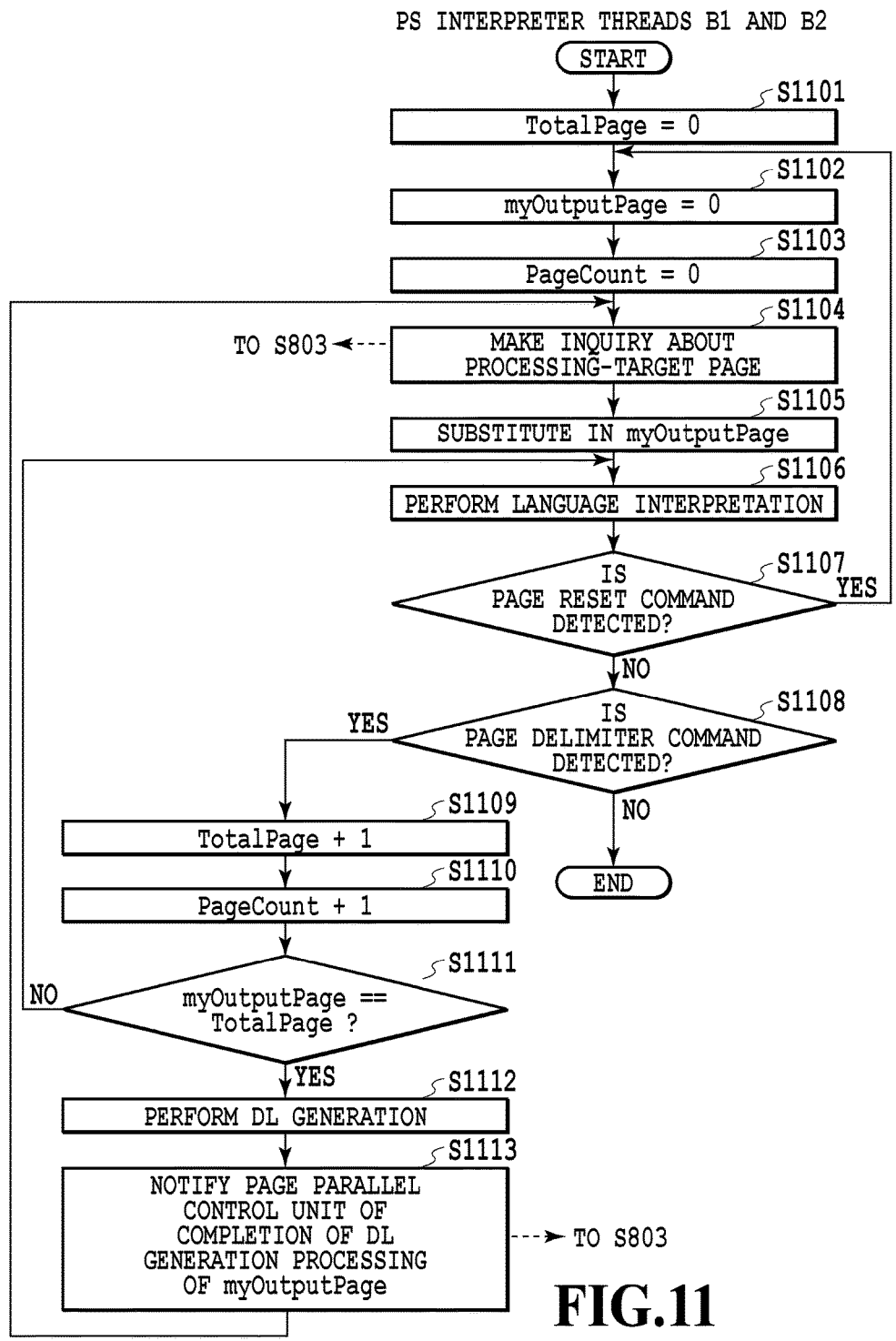
FIG. 11 is a flowchart of an interpreter in the second embodiment.

Next, by using the flowchart shown in FIG. 11, the flow of the parallel DL generation control in the threads B1 and B2 of the PS interpreter 201 of the second embodiment is explained.

The PS interpreter 201 has three counter values of PageCount, TotalPage, and myOutputPage as the internal page counter. PageCount and myOutputPage are the same as those of the first embodiment. TotalPage is a counter value to store the value of the total number of pages for which the language interpretation has already been completed, which is not affected by the PDL command to reset PageCount, such as startjob.

Upon receipt of the number of processing-target pages from the page parallel control unit 200, the PS interpreter 201 stores the value in myOutputPage and starts processing. While TotalPage is smaller than myOutputPage, the PS interpreter 201 performs only the language interpretation processing (i.e., performs page skip processing) while incrementing PageCount and TotalPage. The PS interpreter 201 performs the language interpretation and the DL generation (page drawing processing) in the case where TotalPage becomes equal to OutputPage. On the completion of the DL generation, the PS interpreter 201 notifies the page parallel control unit 200 of the completion along with the page number for which the DL generation has been performed and makes an inquiry to the page parallel control unit 200 about the next processing-target page number.

On detecting startjob, the value of PageCount is reset to "0", but TotalPage continues to hold the value as it is. After this, the PS interpreter 201 makes an inquiry again to the page parallel control unit 200 about the DL generation-target page and repeats the processing. The value of PageCount is reset in the case where startjob is detected, but the total number of pages is managed by TotalPage irrespective of the reset processing. Because of this, at the time of determining whether to perform the DL generation for a page in processing, by using the value of TotalPage, it is made possible to perform page control without being affected by the reset processing. Like the processing of the PS interpreter explained in the first embodiment, the processing shown in FIG. 11 is started on the activation of the threads B1 and B2 by the page parallel control unit 200 at step S802 shown in FIG. 5.

First, at step S1101, the PS interpreter 201 sets TotalPage of the internal page counter value to 0 as the initialization processing. At step S1102, the PS interpreter 201 sets myOutputPage of the internal page counter value to 0 as the initialization processing. At step S1103, the PS interpreter 201 sets PageCount of the internal page counter value to 0 as the initialization processing.

After this, the processing at step S1104 to step S1107 is the same as the processing at step S904 to step S907 shown in FIG. 9.

Next, at step S1107, the PS interpreter 201 determines whether the command to reset PageCount, such as startjob, has been detected as the results of performing the language interpretation at step S1106. In the case of not having detected the command, the PS interpreter 201 advances the processing to step S1108. In the case of having detected the command, the PS interpreter 201 returns to step S1102 and repeats the processing.

Next, at step S1108, the PS interpreter 201 determines whether the page delimiter command has been detected as the results of performing the language interpretation. In the case of having detected the page delimiter command, the PS interpreter 201 advances the processing to step S1109. In the case of not having detected the page delimiter command, this means that the final end of the PDL data is reached, and therefore, the PS interpreter 201 terminates the processing.

Next, at step S1109, the PS interpreter 201 adds 1 to the value of TotalPage.

Next, at step S1110, the PS interpreter 201 adds 1 to the value of PageCount.

Next, at step S1111, the PS interpreter 201 determines whether the value of myOutputPage is equal to the value of TotalPage. In the case where both are equal, the PS interpreter 201 determines that the page in processing for which the language interpretation has been performed at step S1106 is the DL generation processing-target page and advances the processing to step S1112. In the case where both are not equal, the PS interpreter 201 returns to step S1104 and repeats the processing.

The processing at steps S1112 and S1113 is the same as the processing at steps S912 and S913 shown in FIG. 9, and therefore, explanation is omitted.

By the above processing, the parallel DL generation control in the threads B1 and B2 by the PS interpreter 201 is performed.

As above, in the present embodiment, in the case where the PDL command that gives instructions to perform page reset at the time of performing the printing processing by multithread, the internal page counter value is reset. On the other hand, the total number of pages is held in another counter value and the subsequent processing is continued. At the time of determining whether to perform the DL generation, by using the counter value of the total number of pages, it is possible to continue the processing without paying attention to the difference in the internal page counter value between the page parallel control unit 200 and the PDL data interpretation unit 202. Consequently, it is possible to avoid the inconsistency in print data.

(Other Embodiments)

In each embodiment described above, the startjob operator of PS is taken as an example of the page reset command. However, the application range of the present invention is not limited to this operator and the operator may be an exitserver command (operator) of PS. Further, it is also possible to apply the present invention to a command having the same meaning in another PDL.

Furthermore, in each embodiment described above, the aspect is explained in which the page parallel control unit 200 and the PS interpreter 201 are distinguished from each other, but it is also possible to cause one of the PS interpreters to have the function performed by the page parallel control unit therein.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In processing using a print data processing apparatus that parallelly interprets pages of print data, even in the case where a command to rest the number of already interpreted pages is included in the print data, it is possible to output printing results in which no page is missing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006673, filed Jan. 15, 2016, which is hereby incorporated by reference wherein in its entirety.

What is claimed is:

1. A print data processing apparatus comprising:
a plurality of interpretation units each having a data interpretation unit configured to interpret print data, a generation unit capable of generating intermediate data of the print data based on interpretation by the data interpretation unit, and a first holding unit configured to hold a number of pages already interpreted by the data interpretation unit; and
a notification unit configured to notify a corresponding interpretation unit of the plurality of interpretation units of a page number for which intermediate data should be generated, wherein
the interpretation unit further has:
a second holding unit configured to hold a kind of number of pages different from the number of pages of the first holding unit;
a first processing unit configured to, in a case of detecting a page reset command to invalidate contents interpreted hitherto, update the number of pages held by the second holding unit by adding the number of pages held by the first holding unit at a point in time of detection of the page reset command to the number of pages held by the second holding unit, wherein the interpretation unit resets the number of already interpreted pages in accordance with the page reset command; and
a second processing unit configured to, in a case where a sum of the number of pages held by the first holding unit and the number of pages held by the second holding unit coincides with the page number notified by the notification unit, cause the generation unit to perform generation of the intermediate data.

2. The print data processing apparatus according to claim 1, wherein the number of pages held by the second holding unit is not reset in a case where the page reset command is detected.

3. The print data processing apparatus according to claim 1, wherein the generation unit generates intermediate data in which the number of already interpreted pages held by the first holding unit is used as a page number of a corresponding page.

4. The print data processing apparatus according to claim 1, wherein the notification unit notifies the plurality of interpretation units of different page numbers, respectively.

5. The print data processing apparatus according to claim 1, wherein the interpretation unit causes the data interpretation unit to interpret data of all pages of the print data.

6. The print data processing apparatus according to claim 1, wherein the print data is PDL data in a page non-independent language.

7. The print data processing apparatus according to claim 6, wherein the page non-independent language is PostScript and the page reset command is a startjob command or an exitserver command.

8. The print data processing apparatus according to claim 1, wherein the interpretation unit and the notification unit are activated as a thread.

* * * * *